US006278009B1

(12) United States Patent
Mendez Llatas et al.

(10) Patent No.: US 6,278,009 B1
(45) Date of Patent: Aug. 21, 2001

(54) HETEROGENEOUS CATALYST COMPONENTS FOR OLEFINS POLYMERIZATION, PREPARATION PROCESS AND USE THEREOF

(75) Inventors: Luis Mendez Llatas, Mostoles; Antonio Muñoz-Escalona Lafuente, Madrid; Jose Sancho Royo, Madrid; Pilar Lafuente Cañas, Madrid; Wilfried Michiels Vega, Alcala de Henares; Begoña Peña Garcia, Madrid, all of (ES)

(73) Assignee: Repsol Quimica S.A., Madrid (ES)

( * ) Notice: Subject to any disclaimer, the term of this patent is extended or adjusted under 35 U.S.C. 154(b) by 0 days.

(21) Appl. No.: 09/016,211

(22) Filed: Jan. 30, 1998

(30) Foreign Application Priority Data

Feb. 1, 1997 (ES) .................................................... 9700201

(51) Int. Cl.$^7$ .................................................... C07F 17/00
(52) U.S. Cl. .................................. 556/9; 556/51; 556/57; 556/42; 556/81; 556/400; 556/465; 502/104; 502/129; 502/227; 502/236; 502/242
(58) Field of Search .............................. 556/9–12, 51–53, 556/57–58, 42–44, 81, 400, 465; 502/103, 104, 129, 227, 236, 242

(56) References Cited

U.S. PATENT DOCUMENTS

| 5,057,475 | 10/1991 | Canich et al. | 502/104 |
|---|---|---|---|
| 5,741,868 | * 4/1998 | Winter et al. | 526/127 |
| 5,753,769 | 5/1998 | Ueda et al. | 525/323 |
| 5,854,165 | * 12/1998 | Yabunouchi et al. | 502/117 |
| 5,892,075 | * 4/1999 | Murata et al. | 556/9 |
| 5,997,392 | * 11/1999 | Royo et al. | 556/11 |
| 6,018,064 | 1/2000 | Mendez Llatas et al. | 556/11 |

FOREIGN PATENT DOCUMENTS

| 26 08 863 | 9/1977 | (DE) . |
|---|---|---|
| 38 40 772 | 6/1990 | (DE) . |
| 0 206 794 | 12/1986 | (EP) . |
| 0 260 130 | 3/1988 | (EP) . |
| 0 277 004 | 8/1988 | (EP) . |
| 0 293 815 | 12/1988 | (EP) . |
| 0 314 797 | 5/1989 | (EP) . |
| 0 323 716 | 7/1989 | (EP) . |
| 0 361 866 | 4/1990 | (EP) . |
| 0 367 503 | 5/1990 | (EP) . |
| 0 368 644 | 5/1990 | (EP) . |
| 0 426 637 | 5/1991 | (EP) . |
| 0 474 391 | 3/1992 | (EP) . |
| 0 628 566 | 12/1994 | (EP) . |
| 0 757 053 | 7/1996 | (EP) . |

OTHER PUBLICATIONS

Hansjörg Sinn and Walter Kaminsky, "Ziegler–Natta Catalysis" published in *Advances in Organometallic Chemistry*, vol. 18 by Academic Press, Inc., 1980, pp. 99–149.

* cited by examiner

Primary Examiner—Yogendra Gupta
Assistant Examiner—Derrick G. Hamlin
(74) Attorney, Agent, or Firm—Ladas & Parry

(57) ABSTRACT

It is shown metallocenes with functionalized bridge of formula

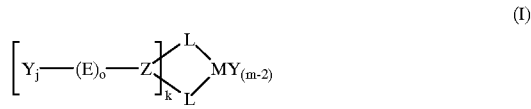

(I)

wherein M represents a transition metal of groups 3, 4, 5 or 6, L represents cyclopentadienyl-type ligands, Y represents a halogen and which can own one or various bridges between unities L. At least one of these bridges is functionalized through a group constituted by the union between a halogen atom and a silicon, germanium or tin atom. It is also shown a method for the synthesis of these metallocene compounds starting from the corresponding metallic halure and a precursor of the ligand which has leaving groups. These metallocene compounds are used as catalyst precursors for the homopolymerization and copolymerization of olefins. It is also shown methods for supporting these metallocenes on inorganic solids in order to obtain solid catalyst systems for olefins polymerization processes in a heterogeneous phase.

22 Claims, No Drawings

HETEROGENEOUS CATALYST COMPONENTS FOR OLEFINS POLYMERIZATION, PREPARATION PROCESS AND USE THEREOF

STATE OF THE ART PRIOR TO THE INVENTION

It is well known that metallocene compounds such as bis(cyclopentadienyl)titanium dialkyl or bis (cyclopentadienyl)zirconium dialkyl in combination with alkyl aluminiums act as catalysts for olefin polymerization in homogeneous phase. Thus, German patent DE-2,608,863 describes the use of bis(cyclopentadienyl)titanium dialkyl in combination with trialkylaluminium and a controlled quantity of water in olefins polymerization.

The controlled hydrolysis of alkyl aluminiums gives rise to the formation of species containing an Al—O bond (aluminoxane) which are real co-catalysts in the polymerization of olefins with metallocenes. Kaminsky (Adv. Organomet. Chem. 1980, 18, 99) shows that aluminoxanes in combination with dichlorometallocenes produce catalyst systems which are very active in ethylene polymerization.

It is also possible (Turner, EP 277004 and Ewen et al. EP 426637) to use co-catalysts formed by bulky boron compounds which, acting as non-coordinative anions, stabilize the cationic form of the metallocene without preventing the incorporation of the olefin in the polymerization process.

The polymerization processes that use homogeneous catalyst systems produce high polymerization activities. However, most industrial processes require heterogenous catalyst systems which on the one hand produce polymers with a controlled morphology, but on the other hand have an activity of the order of the homogeneous systems.

In European patent EP 206794 it is described heterogeneous catalysts obtained through simultaneous or subsequent (in any order) addition of aluminoxane and metallocene onto an inorganic support.

This process, according to patent EP 260130, can also be applied to multicomponent systems. These catalysts are those which contain various metallocenes or one metallocene and one non-metallocene compound of a transition element. In this way, polyolefins with a multimodal molecular weight distribution are obtained.

In patents EP 361866, EP 323716, EP 367503, EP 368644 and U.S. Pat. No. 5,057,475 it is described the preparation of a heterogeneous catalyst system composed by one aluminoxane and one metallocene characterized in that the aluminoxane is generated "in situ" through reaction of a trialkylaluminium with undehydrated silica. The use of this catalyst system in α-olefins polymerization gives rise to high activities.

Another well known technique used in the preparation of heterogeneous catalyst is the chemical modification of the inorganic support. In patents EP 474391 and EP 314797 it is described a process wherein the support, before the addition of the metallocene, is treated with an organoaluminium compound which reacts with hydroxyl groups present in the silica surface.

The above described catalyst systems present the drawback that the catalyst is not tightly enough bonded to the support so that the separation of the metallocene from the support can occur, producing polymerization in solution, which prejudices the emorphology of the obtained polymer.

As a consequence of that, methods for obtaining the formation of a chemical bond between the support and the metallocene are looked for. A possible solution is the formation of a chemical bond by reacting a functionalized metallocene and a partly dehydrated silica. In patents EP 293815 and DE 3718888 it is described a method for the preparation of a supported catalyst wherein the chemical bond between the support and the metallocene is obtained by reacting an alkoxysilane group united to the metallocene and an hydroxy group of the support. The synthesis of this catalyst is difficult and very low yields are obtained. Furthermore, the activity in the polymerization of the olefins of the resulting catalysts is rather low.

Patent DE 3840772 describes the use of metallocenes functionalized with vinyl groups united to the cyclopentadienyl ring. Heterogeneous systems are obtained by reacting the double bond with polysiloxanes in the presence of a fit catalyst. This method presents the drawback of needing an additional purification process for removing this catalyst.

According to patent EP 628566, it is possible to prepare heterogeneous catalysts by reacting ligands already chemically bonded to the support first with alkyllithium and then with metal halides $MX_r$ (wherein M is a transition metal and X is a halide). This process produces catalysts with the metallocene tightly bonded to the support. They are used in olefins polymerization in combination with alumoxanes. Also in this case it is necessary a purification of the catalyst system to eliminate the residues of the reagents used in its formation.

EP-A-757053 discloses new metallocenes characterized by the following general formula:

$X_mM(L—M^2(R^1R^2)—A—ZR^3_oHal_p)_n$, wherein M is a metal of group 4, 5 or 6 of the periodic table, each X is independently selected from hydrogen, halogen or a $C_1$–$C_{40}$ carbon-containing rest; me is equal to 1, 2 or 3; n is equal to 1 or 2; each L is independently a Π ligand, which coordinates to the central atom M; each $M^2$ is independently selected from silicon, germanium or tin; $R^1$ is a $C_1$–$C_{20}$ carbon-containing group; $R^2$ is a $C_1$–$C_{20}$ carbon-containing group of a Π ligand, which coordinates to the central atom M; each A is independently a divalent $C_1$–$C_{40}$ carbon-containing rest; each Z is independently selected from boron, silicon, germanium or tin; each $R^3$ is independently selected from hydrogen or a $C_1$–$C_{20}$ carbon -containing rest; o is equal to 0, 1 or 2; each Hal is independently selected from a halogen atom; p is equal to 1, 2 or 3.

These compounds are characterized by the presence of a hydrocarbon bridge connecting two silicon, germanium or tin atoms to whom the halogen atom is connected. This characteristic makes them especially suitable in the preparation of supported catalysts.

An object of the present invention is to provide new catalyst component comprising a bridged metallocene having a Si—Cl functional group bonded to bridge. The compounds can be supported on silica.

DESCRIPTION OF THE INVENTION

In this invention it is described organo metallic compounds of transition of groups 3, 4, 5 or 6 of the periodic table of the metallocene-type. Besides, the compounds of the present invention are characterized in that they have at least one link or bridge between the cyclopentadienyl type unities. The bridge is characterized in that it shows at least one functionality, either include in the bridge or bonded to it, this being a Si—Y, Ge—Y or Sn—Y-type unity, preferably Si—Y, Y being halogen; preferably Y is chlorine or bromine.

In the present invention it is described the synthesis of these metallocenes as well as methods for supporting these compounds onto solids. The invention refers in general to metallocenes represented by the following formula (Formula 1)

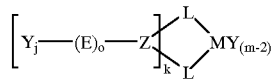

(I)

Wherein:
Y is halogen;
M is a transition metal of groups 3–6 of the periodic table;
each L is selected from a cyclopentadienyl-type unity, including indenyl or fluorenyl, substituted or not and the substituents being equal or different, united to M through a π bond; Z is a group that forms a union bridge between the two unities L, which can have between 0 and 20 carbon atoms and between 0 and 5 oxygen, sulfur, nitrogen, phosphorus, silicon, germanium, tin or boron atoms;
E is a spacer group that unites Z and Y and can have between 0 and 20 carbon atoms and between 0 and 5 oxygen; sulfur, nitrogen, phosphorus, silicon, germanium, tin or boron atoms. It is characterized for having in its skeleton at least one silicon, germanium or tin atom, which the substituent Y is united to;
o is a number of value 0 or 1;
k is a number of value 1,2 or 3;
m is a number equal to or higher than 2 and coinciding with the oxidation state of the transition metal;
j is a number of value 0 or 1 with the condition that its value is 1 at least once; when j is 1 and o is 0, Z is characterized by having at least one silicon, germanium or tin atom which Y is directly united to;
with the proviso that the compound does not have general formula

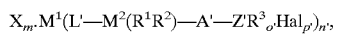

wherein $M^1$ is a metal group 4, 5, or 6 of the periodic table, each X is independently selected from hydrogen, halogen or a $C_1$–$C_{40}$ carbon-containing rest; m' is equal to 1, 2 or 3; n' is equal to 1 or 2; each L' is independently a Π ligand, which coordinates to the central atom $M^1$; each $M^2$ is independently selected from silicon, germanium or tin; $R^1$ is a $C_1$–$C_{20}$ carbon-containing group; $R^2$ is a $C_1$–$C_{20}$ carbon-containing group or a Π ligand, which coordinates to the central atom $M^1$; each A' is independently a divalent $C_1$–$C_{40}$ carbon-containing rest; each Z' is independently selected from boron, silicon, germanium or tin; each $R^3$ is independently selected from hydrogen or a $C_1$–$C_{20}$ carbon-containing rest; o' is equal to 0, 1 or 2; each Hal is independently selected from a halogen atom; p' is equal to 1, 2 or 3.

The invention preferably refers to metallocenes represented by the following formula (formula II):

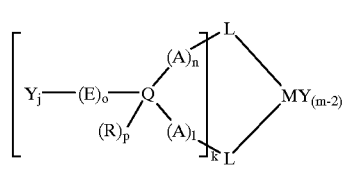

(II)

wherein:
Y is halogen;

M is a transition metal of groups 3, 4, 5 or 6 of the periodic table;
each L is selected from a cyclopentadienyl-type unity, including indenyl or fluorenyl, substituents or not and the substituents being equal or different, united to M through a π bond;
Q is an element of group 13, 14 or 15;
E is a spacer group that unites Q and Y and can have between 0 and 20 carbon atoms and between 0 and 5 oxygen, sulfur, nitrogen, phosphorus, silicon, germanium, tin or boron atoms and it is characterized by having in its skeleton at least one silicon, germanium or tin atom, which the substituent Y is united to;
R is selected from the group comprising: hydrogen, halogen, halocarbon, substituted halocarbon, $C_1$–$C_{20}$ alkyl, $C_2$–$C_{20}$ alkenyl, $C_6$–$C_{20}$ aryl, $C_7$–$C_{40}$ alkylryl, $C_7$–$C_{40}$ arylalkyl, $C_8$–$C_{20}$ arylalkenyl, alkoxy, siloxy and combinations thereof;
A, equal to or different from each other is a bridge group between unities L and Q constituted either by only on divalent atom of group 16, preferably —O—, or by a trivalent monosubstituted element of group 15, preferable >N—R, R being defined above, or a tetravelent disubstituted element of group 14, preferably >C(R)$_w$ or >Si(R)$_2$, R being defined above, or by a chain of 2 or more atoms substituted or not, this chain being preferably of type —C—C—, —C—Si—, —Si—Si—, —Si—O—, —C—O, —C—N—, —C—C—C, —C—Si—C—, —Si—O—Si—;
o is a number of value 0 or 1
k is a number of value 1, 2 or 3;
m is a number equal to or higher that 2 and coinciding with the oxidation state of the transitions metal;
p, n, l are number of value 0 or 1.
j is a number of value 0 or 1 with the condition that its value is 1 at least once, when j is 1 and o is 0, Q is a silicon, germanium or tin atom;
with the proviso that the compound does not have general formula

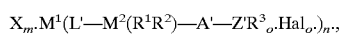

wherein $M^1$ is a metal of group 4, 5 or 6 of the periodic table, each X is independently selected from hydrogen, halogen or a $C_1$–$C_{40}$ carbon-containing rest; m' is equal to 1, 2 or 3; n' is equal to 1 or 2; each L' is independently a Π ligand, which coordinates to the central atom $M^1$; each $M^2$ is independently selected from silicon, germanium or tin; $R^1$ is a $C_1$–$C_{20}$ carbon-containing group; $R^2$ is a $C_1$–$C_{20}$ carbon-containing group or a Π ligand, which coordinates to the central atom $M^1$; each A' is independently a divalent $C_1$–$C_{40}$ carbon-containing rest; each Z' is independently selected from boron, silicon, germanium or tin; each $R^3$ is independently selected from hydrogen or a $C_1$–$C_{20}$ carbon-containing rest; o' is equal to 0, 1 or 2; each Hal is independently selected from a halogen atom; p' is equal to 1, 2 or 3.

In the most preferred embodiment the invention refers to metallocenes having the following general formulas (III) and (IV)

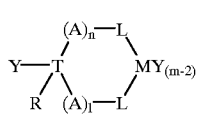

III

IV

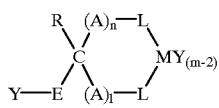

wherein:

L, M, m, Y, E, R, l, n have already been defined; C is a carbon atom; T is selected from: silicon, germanium or tin. What follows are descriptive and non-limiting examples of the structural formulas of some metallocene compounds according to the present invention:

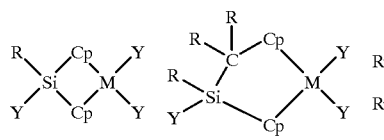

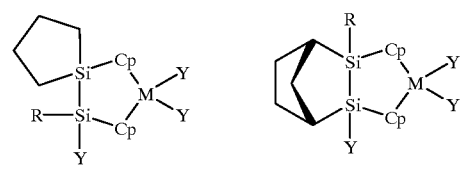

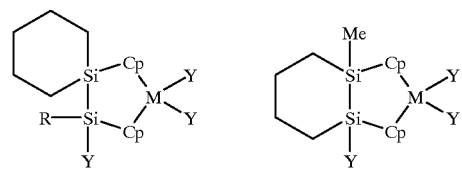

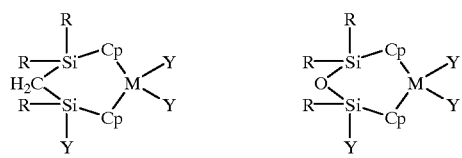

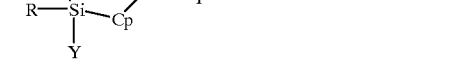

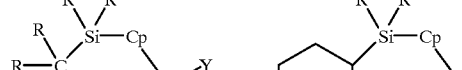

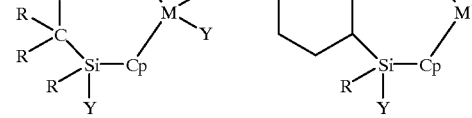

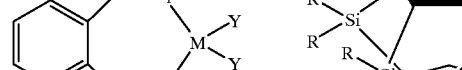

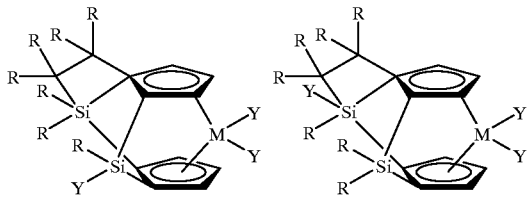

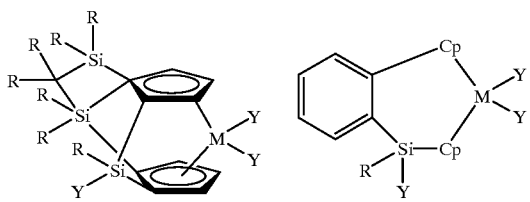

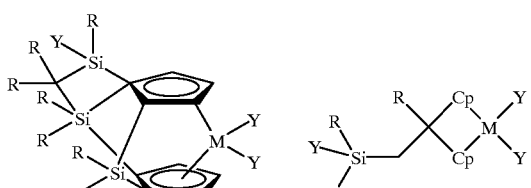

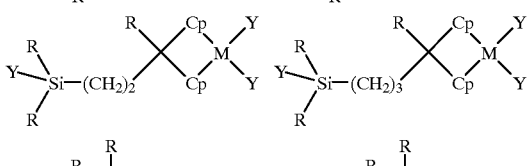

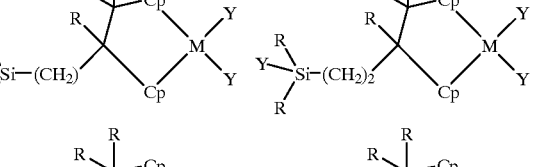

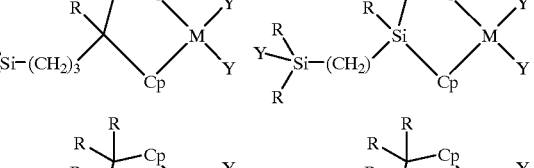

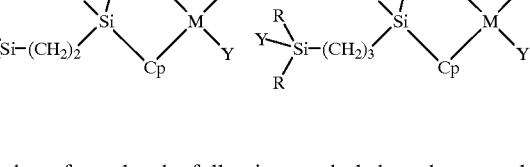

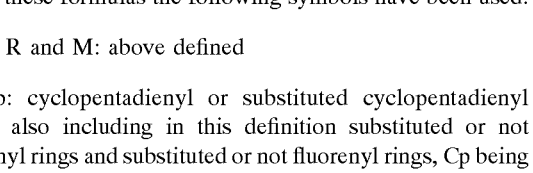

In these formulas the following symbols have been used:

Y, R and M: above defined

Cp: cyclopentadienyl or substituted cyclopentadienyl ring, also including in this definition substituted or not indenyl rings and substituted or not fluorenyl rings, Cp being able to represent in the same formula equal or different rings.

The synthesis of the functionalized metallocenes object of the present invention can be obtained according to the general method represented in the following scheme.

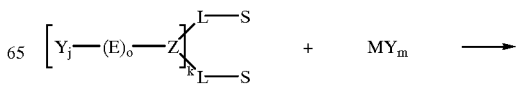

-continued

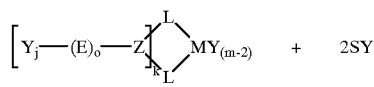

being:

Y, X, L, E, M, j, m and o defined above;

S: leaving group united to the cyclopentadienyl ring, preferably constituted by a unity $T(R^4)_3$, T being silicon, germanium or tin and $R^4$ is $C_1$–$C_{20}$ alkyl. S represents preferably groups $Si(CH_3)_3$ and $Sn(CH_3)_3$. In case represented by this scheme, S can represent unities equal or different; in general, the union L—S can represent an ionic, s or π bond or a combination thereof. The union L—M always represents a bond with a high π character. Preferred compounds of general formula III can be obtained according to the following scheme:

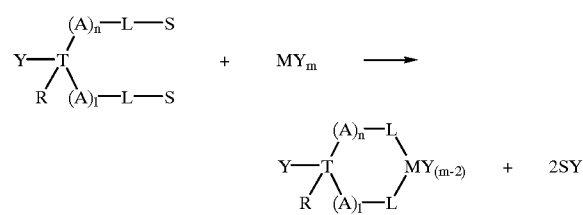

The synthesis of functionalized metallocenes having a carbon bridge as depicted in formula IV could be achieved following the general procedure described in this document starting from a suitable ligand:

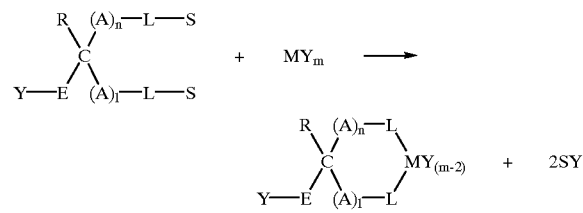

In order to achieve a suitable functionalized ligand, an olefinically unsaturated precursor having the unsaturation within unit E in the formula could be used. Reacting this precursor under hydrosilylation, hydrogermanilation or hydrostannilation conditions the suitable functional group (Si—Y, Ge—Y or Sn—Y) could be obtained.

Alternatively, a functionalized metallocene according to formula IV could be obtained from a metallocene already having an olefinic unsaturation as part of unit E. Metallocenes of this type are known in the current literature, for example EP 685495 (Phillips). The functionalization of the metallocene could be achieved again by reacting it under hydrosilylation, hydrogermanilation or hydrostannilation conditions to attach the suitable functional group (Si—Y, Ge—Y or Sn—Y).

In order to illustrate the different approaches towards the synthesis, the following scheme of a compound having the structure $Cl_3SiCH_2CH_2C(CH_3)Cp_2ZrCl_2$ is shown. All the reactive steps shown in this scheme (represented by an arrow) can be of common knowledge for a person skilled in the art of metallocene synthesis and can be obtained by employing reagents different from those shown in the scheme.

The procedure employed for step (a) can be learned, for example, from Stone et al. In *J. Org. Chem.* 1984, 49, 1849. The procedure of step (b) can be learned, for example for *J. Organomet. Chem.,* 1992, 435, 299, or *J. Chem. Soc. Dalton Trans.* 1994, 657 or EP 685495. The procedure for step (c) can be learned from U.S. Pat. No. 5,191,132. Step (d) is the obtaining of the dianion and could be achieved with many different reagents (e.g. Li, Na, K, BuLi, BuMgBr, etc.), here BuLi is shown in order to illustrate one of the most popular reactants employed. Step (e) is also of very common use in the synthesis of metallocenes, see again, for example, *J. Organomet. Chem.,* 1992, 435, 299, j or *J. Chem. Soc., Dalton Trans.* 1994, 657 or EP 685695. Procedures for steps (l), (g) or (j) can be learned from the present document but also from *Organometallics* 1995, 14, 177 or *Angew. Chem. Int. Ed. Engl.,* 1994, 33, 1479. Hydrosilylation [steps (h) and (i)] can also be achieved with different reagents, being $H_2PtCl_6.6H_2O$ one of the most commonly employed (see for example *Adv. Organomet. Chem.* 1979, 17, 407 or *J. Fluorine Chem.* 1994, 68, 71 or EP 628566).

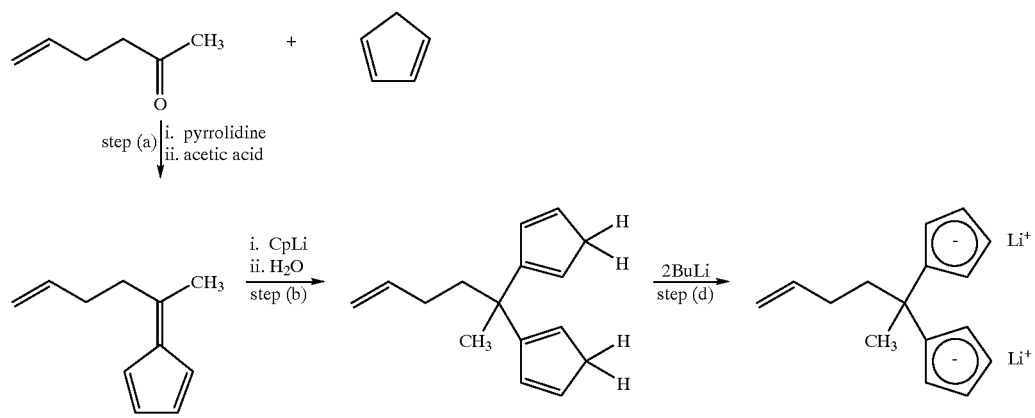

-continued

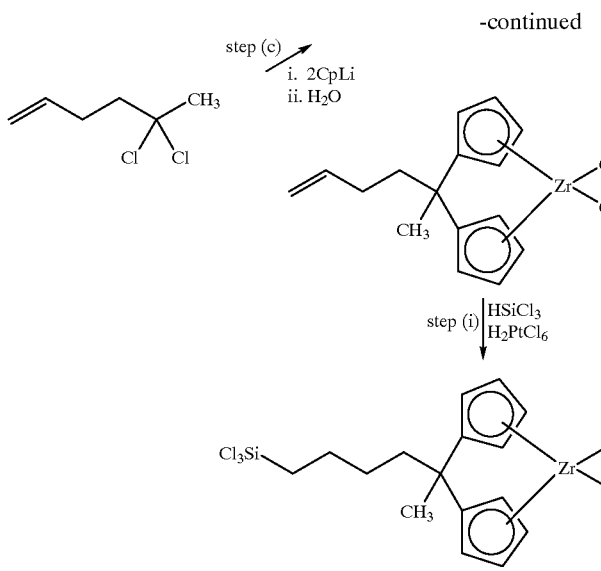
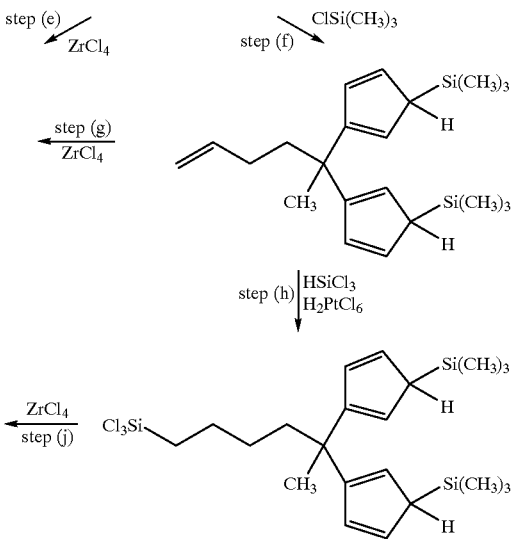
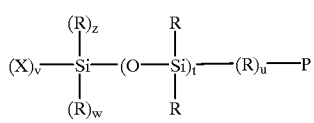

These processes for the synthesis of metallocenes with functionalized bridge can be done in the presence of solvent or not. In case a solvent is used, this can be preferably an aliphatic hydrocarbon, an aromatic hydrocarbon, or mono or polyhalogen containing derivatives therefrom. A mixture of two or more solvents can be used too.

These processes for the synthesis of metallocenes with functionalized bridge can be done in a temperature range between −20 and 300° C., preferably between 0 and 200° C., or at the reflux temperature of the used solvent system.

These processes for the synthesis of metallocenes with functionalized bridge can be done with or without protection from light.

Another object of the present invention is to provide new supported catalyst components showing a good productivity and producing polyolefins characterized by a good morphology. The supported catalyst component comprising an inorganic support and a metallocene described in the present invention can be prepared by adding the reagents to a fit inert solvent. Examples of useful solvents are ethers such as tetrahydrofurane (THF), aromatic hydrocarbons, such as toluene and aliphatic hydrocarbons such as heptane or hexane. The inorganic support according to the present invention contains hydroxyl groups. Illustrative, but not limiting, examples of supports useful in the field of the present invention are the following: silicates, carbonates, phosphates, clays, metaloxides and mixtures thereof. More preferably: silica, alumina, silica-alumina, silica titanates, silica vanadates, silica chromates, aluminium phosphates, phosphated silica and possible mixtures thereof.

The surface area of the inorganic support is preferably 10–10000 $m^2/g$, more preferably 150–650 $m^2/g$. The pore volume is preferably 0.2–4.0 $cm^3/g$, more preferably 0.6–2.7 $cm^3/g$. The average particle size is preferably 1–1000 microns, more preferably 5–100 microns.

The water contained in the support can be optionally removed before reacting the support with the metallocene. The dehydration process can be performed by heating the support in an oven in inert atmosphere at a temperature between 120° C. and 1000° C. (preferably between 200 and 800° C.). The amount of hydroxyl groups on the support can be measured in several ways, for example by titration with n-butylmagnesium chloride or triethylaluminium.

The concentration of hydroxy-groups depends on the dehydration temperature and on the support used. In case silica is used, it can vary from 0,1 to 5 mmol OH/g of silica, preferably 0.3 to 3 mmol OH/g of silica or from 0,1 to 7 groups $OH/nm^2$, preferably 0.5 to 5 groups $OH/nm^2$. Once dehydrated, the support has to be protected from environmental humidity, for example by storing it under inert atmosphere (nitrogen or argon). The inorganic support is used as such or it can be previously modified through reaction of the hydroxy-groups with compounds of formula V:

$$(X)_v-\underset{\underset{(R)_w}{|}}{\overset{\overset{(R)_z}{|}}{Si}}-(O-\underset{\underset{R}{|}}{\overset{\overset{R}{|}}{Si}})_t-(R)_u-P \quad\quad V$$

being:
- R: atom of hydrogen, halogen, halocarbon, substituted halocarbon, $C_{1-20}$ alkyl, $C_{2-20}$ aryl, $C_{7-40}$ alkylaryl, $C_{7-40}$ arylalkyl, $C_{8-20}$ arylalkenyl, alkoxy, siloxy and combinations thereof
- X: halogen or group $OR^4$ wherein $R^4$ has the same meaning given above
- P: $NH_2$, NHR, SH, OH or PHR
- v+x+w=3, v being different from 0
- t and u are comprised between 0 and 10.

Some examples of compounds of formula V are:
3-Methylpropyltrimethoxysilane,
N-Aminopropyldimethosymethylsilane,
3-mercaptopropyltrimethoxy-silane Both the functionalized metallocenes object of the present invention and their derivatives supported onto inorganic solids can be used in polymerization reactions in conjunction with one or various co-catalysts. Said co-catalysts are anionic non-coordinative compounds of alumoxane, modified alumoxane or boron compounds type. In case boron derivatives are used, the supported systems have to be previously treated for alkylating the metallocene unities. This alkylation can be done by using alkylating agents described in literature. Illustrative but non-limiting examples of co-catalysts are: methylalumoxane (MAO), dimethylaniline tetrakis(pentafluorophenyl)boro or trispentafluoro-phenylborane. The catalyst systems described in the present invention are useful for the homo and copolymerization of α-olefins, in suspension or in gas phase, as well as in mass polymerization at high temperatures and pressures. The temperature can vary between 31 60° C. and 300° C., preferably between 40° C. and 250° C. The pressure can vary between 1 and 2000 atmospheres. The polymerization time can vary between 1 second and 6 hours, according to the process type. The process is applicable to all olefins which can be polymerized by Ziegler-Natta catalysts, it is particularly fit for the homopolymerization of alpha-olefins for 2 to 20 carbon atoms such as ethylene, propylene, 1-butene, 1-hexene, 4-methyl-1-pentene and similar, as well as cyclic monomers and/or dienes. It is also fit for the copolymerization of ethylene with alpha-olefins different from ethylene, having from 3 to 20 carbon atoms, preferably from 3 to 6 carbon atoms, such as propylene, 1-butene 1-hexene, 4-methyl-1-pentene and similar, as well as cyclic monomers and/or dienes. The copolymerization of more that two alpha-olefins is possible too.

EXAMPLES

General Conditions: The metallocenes synthesis was done in all its steps under the protection of an atmosphere of dry nitrogen, either in a dry box or by using the techniques Schlenk. The used solvents were dried before being used according to the methods described in literature. In the following examples these abbreviations are used for representing the written formulas:

Cp: cyclopentadienyl radical

Me: methyl radical TMS: trimethylsilyl radical

Example 1

Synthesis of ((chloromethyhlsilaudiyl)bis (cyclopentadienyl))zirconium(IV)dichloride, $Cl(Me)SiCp_2ZrCl_2$ This example is useful for describing a zirconium metallocene with a functionalized bridge and its synthesis.

1.1 Preparation of the dilithium salt of cyclopentadienyltrimethylsilane, CpTMSLi A solution of 40 g (0.29 mol) of cyclopentadienyltrimethylsilane in 300 ml of hexane is added to 200 ml of a 1.25 M solution of butyllithium in hexane. During the addition, the reaction mixture temperature is maintained at 0–5° C. After 3 h at room temperature, the obtained white solid is settled and washed once with 150 ml of hexane. This solid is identified as the desired product. $^1$H—NMR ($d_8$-tetrahydrofurane) 5.95 (pseudo-t, 2H), 5.85 (pseudo-t, 2H), 0.16 (s, 9H). $^{13}$C—NMR ($d_8$-tetrahydrofurane) 112.9, 112.2, 108.09, 2.89.

1.2 Preparation of (dichloro(methyl)silyl) (trimethylsilyl)cyclopentadiene, $Cl_2(Me)SiCpTMS$ A solution of 30 ml (0.25 mol) of trichloromethylsilane and 250 ml of dry hexane is added to a suspension of 0.25 mol of CpTMSLi and 200 ml of hexane. Then, the reaction mixture is heated at the reflux temperature for 5 h. After cooling, the solid is filtered and washed with 200 ml more of hexane. From the union of the filtered product and the washing waters, after elimination of the solvent in vacuum, a pale yellow oil that distils at 73–74° C. (2 Torr) is obtained. The obtained product is mostly the isomer 1-(dichloro (methyl)silyl)-1-(trimethylsilyl)cyclopentadiene. Overall yield of steps 1.1 and 1.2: 66.7 g (92%). $^1$H—NMR ($C_6D_6$): 6.61 (m, 2H), 6.42 (m, 2H), 0.13 (s, 3H), 0.4 (s, 9H). $^{13}$C—NMR ($C_6D_6$): 134.2, 133.6, 59.0, 2.5, -1.1.

1.3 Preparation of bis (trimethylsilylcyclopentadienyl)methylchlorosilane, $Cl(Me)Si(CpTMS)_2$ 80 ml of a 1 M solution of [CpTMS]MgCl (chloromagnesium derivative of trimethylsilycyclopentadienile) in tetrahydrofurane is slowly added to a solution of 20.2 g (0.08 mol) of $[Cl_2(Me)SiCpTMS]$ prepared according to 1.2 and 300 ml of hexane. The reaction mixture is maintained under stirring for 18 more h at room temperature. The solid is filtered and washed with hexane (100 ml). The solvent of the filtered product is eliminated and the obtained oil is distilled. The pale yellow fraction that distils at 110° C. (0.5 Torr) is gathered. Yield: 15.8 g (57%). This fraction consists in a mixture of isomers with formula $Cl(Me)Si(CpTMS)_2$.

1.4 Preparation of ((chloromethylsilanediyl)bis (cyclopentadienyl))zirconium(IV)dichloride, $Cl(Me)Si(Cp)_2ZrCl_2$ A solution of 10.14 g (0.029 mol) of $Cl(Me)Si(CpTMS)_2$ and 200 of toluene is quickly transferred to 6.69 g (0.029 mol) of $ZrCl_4$ in a container protected from light. This is immediately introduced in a bath at 110° C. and maintained under stirring for 3 h. Then, it is filtered hot and the solution is immediately cooled in a freezer causing the crystallization of the product, which is gathered through filtration. Yield: 7.7 g (72%). Zr 24.6% (theor.: 24.7%); Cl 28.1% (theor.: 28.8%) $^1$H—NMR ($CDCl_3$): 7.04 (m, 2H), 7.00 (m, 2H), 6.17 (m, 2H), 5.97 (m, 2H), 1.12 (s, 3H). $^{13}$C—NMR ($CDCl_3$): 129.5, 128.2, 114.5, 113.4, 108.2, -1.7. Mass spectrometry: $M^+$ m/z (relative intensity) 373.9 (14%) 372.9 (8%), 371.9 (41%), 370.9 (18%), 369.9 (80%), 368.9 (36%), 367.9 (100%), 366.9 (30%), 365.9 (71%) [M' calculated for $C_{11}H_{11}Cl_3SiZr$: 373.9 (13%), 372.9 (8%), 371.9 (41%), 370.9 (18%), 369.9 (77%), 368.9 (33%), 367.9 (100%), 366.9 (28%), 365.9 (73%)]

Example 2

Synthesis of ((chloromethylsilanediyl)bis (cyclopentadienyl))hafnium(IV)dichloride, $Cl(Me)SiCp_2HfCl_2$ This example describes a hafnium metallocene with functionalized bridge and its synthesis.

a solution of 2.15 g (6.1 mmol) of $Cl(Me)Si(CpTMS)_2$ and 50 ml of toluene is quickly added to 1.95 g (6.1 mmol) of $HfCl_4$ in a container protected from light. Then it is soaked in an oil bath previously heated at 110° C. It is maintained under stirring in these conditions for 2 h, before filtering it hot. The so obtained solution is cooled in a freezer. In this way, it is produced the crystallization of the desired product, which is identified as $Cl(Me)SiCp_2HfCl_2$. Yield: 2.1 g (78%). $^1$H—NMR ($CDCl_3$): 6.95 (m, 2H), 6.90 (m, 2H), 6.10 (m, 2H), 5.90 (m, 2H), 1.12 (s, 3H). $^{13}$C—NMR ($CDCl_3$): 128.2, 126.9, 112.4, 111.4, 109.5, -1.7. Masses spectrometry: $M^+$ m/z (relative intensity) 460.9 (4%), 459.9 (19.5%), 458.9 (19%), 457.9 (65%), 456.9 (50%), 455.9 (100%), 454.9 (60%), 453.9 (55%), 452.9

(31%), 451.9 (10%) [M+ calculated for $C_{11}H_{11}Cl_3SiHf$: 460.9 (4%), 459.9 (21%), 458.9 (19%), 457.9 (70%), 459.9 (45%), 455.9 (100%), 454.9 (54%), 453.9 (51%), 452.9 (28%), 451.9 (8%)].

Example 3

Impregnation of $Cl(Me)SiCp_2ZrCl_2$ onto silica calcined at 400° C.

This example shows an impregnation method of a metallocene with a functionalized bridge onto an inorganic support. The impregnation reaction of the metallocene compound functionalized in the bridge onto the inorganic support is achieved in a glass reactor of a capacity of 250 ml, equipped with a mechanical stirred in a thermostatic bath, wherein 2.22 g of silica (previously calcined at 400° C., with a concentration of groups OH of 1.55 mmol/g) and 50 ml of dry toluene are added. To this suspension 0.218 g of Cl(Me)SiCp$_2$ZrCl$_2$ is added in inert atmosphere and it is heated at 70° C. under constant stirring for 24 hours. The solid is filtered and washed several times with dry toluene (5×100 ml) and it is carried to dryness in vacuum. The final solid has a Zr content of 1.87% by weight. This supported metallocene catalyst is stable under nitrogen for long periods of time.

Example 4

Impregnation of $Cl(Me)SiCp_2ZrCl_2$ onto silica calcined at 800° C.

4.1 Method A

The impregnation reaction of the metallocene compound functionalized in the bridge onto an inorganic support is done is an glass reactor of a capacity of 250 ml, equipped with a mechanical stirrer and a thermostatic bath, wherein 3.4 g of silica (previously calcined at 800° C., with a concentration of groups OH of 0.796 mmol/g) and 50 ml of dry toluene are added. To this suspension 1.497 g of Cl(Me)SiCp$_2$ZrCl$_2$ in 50 ml of dry toluene is added in inert atmosphere and it is heated at 40° C. under constant stirring for 24 hours. The solid is filtered and washed several times with dry toluene (5×100 ml) and it is carried to dryness in vacuum. The final solid has a Zr content of 1,16% by weight. This supported metallocene catalyst is stable under nitrogen for long periods of time.

4.2 Method B

The impregnation reaction of the metallocene compound functionalized in the bridge onto an inorganic support is done in a glass reactor of a capacity of 250 ml, equipped with a mechanical stirrer and a thermostatic bath, wherein 3.08 g of silica (previously calcined at 800° C., with a concentration of groups OH of 0.796 mmol/g) and 50 ml of dry THF are added. To this suspension 1.35 g of Cl(Me)SiCp$_2$ZrCl$_2$ in 50 ml of dry THF is added in inert atmosphere and it is heated at 40° C. under constant stirring for 24 hours. The solid is filtered and washed several times with dry toluene (5×100 ml) and it is carried to dryness in vacuum. The final solid has a Zr content of 0,53% by weight. This supported metallocene catalyst is stable under nitrogen for long periods of time.

Example 5

Support of $Cl(Me)SiCp_2ZrCl_2$ on functionalized silica

In order to illustrate a method for supporting a functionalized metallocene with the bond Si—Cl within the bridge onto amine-functionalized silica, the following two cases are presented:

5.1. Method A

The reaction between the metallocene and the support is carried out in toluene according to the following procedure: into a three necked 250 ml glass reactor with an inert atmosphere of N$_2$, fitted with an overhead stirrer, a connection to a vacuum/N$_2$ line and a septum, first are added 3,29 g of aminopropil silica gel (with 0,9 mmol/g±0,1 amino groups, from fluka) which has been previously dried for 7 h at 200° C. under inert atmosphere and, second, a solution prepared with 50 ml of dried toluene and 0,219 g(0,59 mmol) of Cl(Me)SiCpZrCl$_2$. The mistare is stirred during 12 h and then the slurry is transferred to a sintered glass filter funnel closed in order to keep an internal n$_2$ atmosphere. The slurry is then filtered and washed with 500 ml of dry toluene in the same filter. The resulting solid is dried at room temperature during 72 h under vacuum and transferred inside a nitrogen dry box where it is weighed, resulting in 3,29 g of a light cream coluoured solid. The toluene rests from the washing were evaporated to dryness leaving behind no residue from the metallocene. The theoretical Zr content is 1,70% (w/w).

5.2 Method B

The same reaction as in Method A is carried out but employing dry dichloromethane instead of toluene as the solvent for this example. The amounts of reactants employed are: 2,75 g of aminopropil silica gel and 0,147 (0,4 mmol) of metallocene. The result is 2,53 g of a light cream coluoured solid with a theoretical Zr content of 1,26% (w/w). Again, the liquids from the washing leave behind no residue from the metallocene.

Example 6

Ethylene polymerization with heterogeneous catalyst

6.1

This example describes the obtaining of a polyethylene by using a heterogeneous catalyst system obtained according to example 3.

In a flask of 500 ml of capacity, dried and cleaned by a nitrogen flux, equipped with two entries, one provided with a rubber stopper and the other with a magnetic stirrer, 200 ml of dry heptane are injected in a nitrogen atmosphere. Then, the flask is introduced in a thermostatic bath and the nitrogen atmosphere is substituted by an ethylene atmosphere through consecutive charges and discharges of ethylene. Then, 10.0 mmol of methylaluminoxane are introduced by using a syringe with a hypodermic needle. The solution being saturated with ethylene and the temperature being at 40° C. 147 mg of a solid prepared according to example 3 suspended in heptane are directly injected in the flask. After 15 minutes of polymerization 1.6 g of polymer is obtained. The activity of the catalyst system is 155 Kg Pe/mol Zr h atm.

6.2

This example describes the obtaining of a polyethylene by using a heterogeneous catalyst system obtained according to Example 4.1. To a glass reactor of 1.3 liter, previously dried and outgased, 600 ml of n-heptane is added. The temperature is raised to 70° C. and the solvent is stirred at 1200 rpm. When the thermic equilibrium is achieved, the medium is saturated with ethylene at a pressure of 2 bars. Then, 20 ml of a MAO solution in toluene (1.5 M in total aluminium) are added. The pressure is then raised to 4 bars with more ethylene and 2 minutes later 0.157 g of the catalyst of example 4.1 is added. The system is fed with ethylene for 15 more minutes and then the polymerization is stopped by preventing the ethylene flux and adding 20 ml of acidified methanol. 3.7 g of polyethylene with a molecular weight ($M_w$) of 169,800 is obtained. The activity of the catalyst system is 185 Kg Polymer/mol Zr h atm.

6.3

This example describes the obtaining of a polyethylene by using a heterogenous catalyst system obtained according to example 4.2. In a glass reactor of 1.3 liter, previously dried and outgased, 600 ml of a n-heptane is added. The temperature is raised to 70° C. and the solvent is stirred at 1200 rpm. When the thermic equilibrium is achieved, the medium is saturated with ethylene at a pressure of 2 bars. Then 6.7 ml of a MAO solution in toluene (1.5 M in total aluminium) are added. The pressure is raised to 4 bars with more ethylene and 2 minutes later 0.172 g of the catalyst of example 4.3 is added. The system is fed with ethylene for 15 more minutes and then the polymerization is stopped by preventing the ethylene flux and adding 20 ml of acidified methanol. 4.5 g of polyethylene with a molecular weight ($M_w$) of 151,900 is obtained. The activity of the catalyst system if 450 Kg Polymer/mol Zr h atm.

6.4

This example describes the obtaining of a copolymer of ethylene and 1-hexene by using a heterogeneous catalyst system with a metallocene functionalized bridge supported onto silica obtained according to example 4.2.

In a glass reactor 1.3 liter, previously dried and outgased, 600 ml of n-heptane and 10 ml of dry 1-hexene are added. The temperature is raised to 70° C. and the solvent is stirred at 1200 rpm. When the thermic equilibrium is achieved, the medium is saturated with ethylene at a pressure of 2 bars. 6.7 ml of a MAO solution in toluene (1.5 M in total aluminium) is added. The pressure is raised to 4 bars and 2 minutes later 0.172 g of the catalyst of example 4.2 is added. The system is fed with ethylene for 15 minutes and then the polymerization is stopped by preventing the ethylene flux and adding 20 ml of acidified methanol. 4.0 g of a ethylene-1-hexene copolymer with a molecular weight ($M_w$) of 64,000 is obtained. The activity of the system is 400 Kg Polymer/mol Zr h atm. The resulting copolymer has 1.5% in molar content of unities deriving from hexene distributed at random.

Example 7

Copolymerization of ethylene and hexene in homogeneous phase

7.1

This example describes the obtaining in homogeneous phase of an ethylene-hexene copolymer by using as catalyst system the metallocene functionalized in the bridge Cl(Me)SiCp$_2$ZrCl$_2$.

The polymerization is achieved in 600 ml of heptane in a reactor of 1 liter of capacity. Ethylene and 1-hexene are added to the reactor so that at a pressure of 4 bars, the ethylene-hexene molar ratio is 2.0. Then, 5.25 mmol of methylalumoxane in toluene and then 3.5 mmol of the metallocene are added. The reaction of temperature is maintained at 70° C. through a heating/cooling system. After 15 minutes 6.5 g of copolymer with a molecular weight ($M_w$) of 15.548 and a ($M_w/M_n$) polydispersity of 2 is obtained. The system activity is 1800 Kg Polymer/mol Zr h atm. The resulting copolymer has 2.8% by mol unities deriving from hexene distributed at random.

What is claimed is:

1. A catalyst system comprising a metallocene compound in combination with a cocatalyst, wherein the metallocene compound has a formula (I):

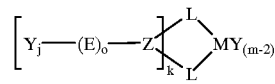

(I)

wherein:

Y is halogen;

M is a transition metal of group 3, 4, 5, or 6 of the periodic table;

each L is independently a cyclopentadienyl-type unity, wherein the cyclopentadienyl-type unity is optionally substituted with substituents, wherein the substituents are equal or different, and wherein each L is united to M through a π bond;

Z is a group that forms a union bridge between the two unities L, wherein Z has 0 to 20 carbon atoms and 0 to 5 oxygen, sulfur, nitrogen, phosphorus, silicon, germanium, tin or boron atoms;

E is a group having 0 to 20 carbon atoms and 0 to 5 oxygen, sulfur, nitrogen, phosphorus, silicon, germanium, tin or boron atoms, wherein E has a skeleton, and wherein the skeleton has at least one silicon, germanium or tin atom, and wherein Y is united with the silicon, germanium, or tin atom of E;

o is a number of value 0 or 1;

k is a number of value 1, 2, or 3;

m is a number equal to or higher that 2 and coinciding with an oxidation state of the transition metal;

j is a number of value 0 or 1;

wherein when j is 1 and o is 0, Z has at least one silicon, germanium or tin atom which Y is directly united to;

wherein each

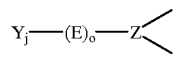

group is the same or different, and wherein j is equal to 1 in at least one

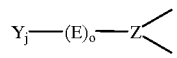

group;

provided that the metallocene compound does not have general formula:

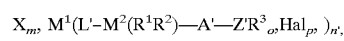

wherein M$^1$ is a metal of group 4, 5, or 6 of the periodic table, each x is independently hydrogen, halogen or a C$_1$–C$_{40}$ carbon-containing rest; m' is equal to 1, 2 or 3; n' is equal to 1 or 2; each L' is independently a pi ligand, wherein each L' coordinates to central atom $M^1$; each $M^2$ is independently silicon, germanium or tin; $R^1$ is a $C_1$–$C_{20}$ carbon-containing group; $R^2$ is a $C_1$–$C_{20}$ carbon-containing group or a pi ligand, wherein each $R^2$ coordinates to central atom $M^1$; each A' is independently a divalent $C_1$–$C_0$ carbon-containing rest; each Z' is independently boron, silicon, germanium or tin; each $R^3$ is independently hydrogen or a $C_1$–$C_{20}$ carbon-containing rest; o' is equal to 0, 1 or 2; each Hal is independently a halogen atom; and p' is equal to 1, 2 or 3.

2. A catalyst system as claimed in claim 1, wherein the metallocene compound has a formula (II):

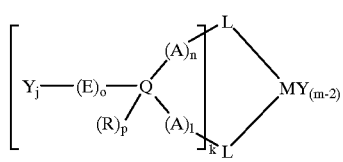

(II)

wherein:

each Y is halogen;

M is a transition metal of group 3, 4, 5 or 6 of the periodic table;

each L is independently a cyclopentadienyl-type unity, wherein the cyclopentadienyl-type unity is optionally substituted with substituents, wherein the substituents are equal or different, and wherein each L is united to M through a π bond;

Q is an element of group 13, 14 or 15;

E is a group having 0 to 20 carbon atoms and 0 to 5 oxygen, sulfur, nitrogen, phosphorus, silicon, germanium, tin or boron atoms, wherein E has a skeleton, and wherein the skeleton has at least one silicon, germanium or tin atom, and wherein Y is united with the silicon, germanium, or tin atom of E;

R is hydrogen, halogen, halocarbon, substituted halocarbon, $C_1$–$C_{20}$ alkyl, $C_2$–$C_{20}$ alkenyl, $C_6$–$C_{20}$ aryl, $C_7$–$C_{40}$ alkylaryl, $C_7$–$C_{40}$ arylalkyl, $C_8$–$C_{20}$ arylalkenyl, alkoxy, siloxy, or a combination thereof;

each A is equal to or different from each other, wherein each A is a bridge group between unities L and Q, wherein each A is a divalent atom of group 16, a trivalent monosubstituted element of group 15, a tetravelent disubstituted element of group 14, or a chain of 2 or more atoms that are substituted or not;

o is a number of value 0 or 1;

k is a number of value 1, 2 or 3;

m is a number equal to or higher than 2 and coinciding with an oxidation state of the transition metal;

p is a number of value 0 or 1;

n is a number of value 0 or 1;

l is a number of value 0 or 1;

j is a number of value 0 or 1;

wherein when j is 1 and o is 0, Q is a silicon, germanium or tin atom;

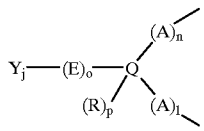

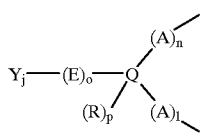

provided that the metallocene compound does not have general formula:

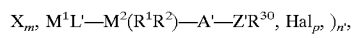

$X_m, M^1L'-M^2(R^1R^2)-A'-Z'R^{30}, Hal_{p'})_{n'},$ wherein $M^1$ is a metal of group 4, 5 or 6 of the periodic table, each X is independently hydrogen, halogen or a $C_1$–$C_{40}$ carbon-containing rest; m' is equal 1, 2 or 3; n' is equal to 1 or 2; each L' is independently a pi ligand, wherein each L' coordinates to central atom $M^1$; each $M^2$ is independently silicon, germanium or tin; $R^1$ is a $C_1$–$C_{20}$ carbon-containing group; $R^2$ is a $C_1$–$C_{20}$ carbon-containing group or a pi ligand, wherein each $R^2$ coordinates to central atom $M^1$; each A' is independently a divalent $C_1$–$C_{40}$ carbon-containing rest; each Z' is independently hydrogen or a $C_1$–$C_{20}$ carbon-containing rest; o' is equal to 0, 1 or 2; each Hal is independently a halogen atom; and p' is equal to 1, 2 or 3.

3. A catalyst system as claimed in claim 1, wherein the metallocene compound has a formula III:

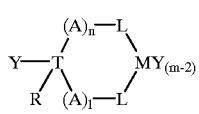

III wherein:

R is hydrogen, halogen, halocarbon, substituted halocarbon, $C_1$–$C_{20}$ alkyl, $C_2$–$C_{20}$ alkenyl, $C_6$–$C_{20}$ aryl, $C_7$–$C_{40}$ alkylaryl, $C_7$–$C_{40}$ arylalkyl, $C_8$–$C_{20}$ arylalkenyl, alkoxy, siloxy, or a combination thereof;:

n is a number of value 0 or 1;

l is a number of value 0 or 1;

each A is equal to or different from each other, wherein each A is a bridge group between unities L and T, wherein A is a divalent atom of group 16, a trivalent monosubstituted element of group 15, a tetravelent disubstituted element of group 14, or a chain of 2 or more atoms that are substituted or not; and T is silicon, germanium or tin.

4. A catalyst system as claimed in claim 1, wherein the metallocene compound has a formula IV:

$$\text{IV}$$

$$\underset{Y-E}{\overset{R}{\underset{|}{\diagdown}}}\underset{(A)_l-L}{\overset{(A)_n-L}{\diagup}}MY_{(m-2)}$$

wherein:
- R is hydrogen, halogen, halocarbon, substituted halocarbon, $C_1$–$C_{20}$ alkyl, $C_2$–$C_{20}$ alkenyl, $C_6$–$C_{20}$ aryl, $C_7$–$C_{40}$ alkylaryl, $C_7$–$C_{40}$ arylalkyl, $C_8$–$C_{20}$ arylalkenyl, alkoxy, siloxy, or a combination thereof;
- E is a group having 0 to 20 carbon atoms and 0 to 5 oxygen, sulfur, nitrogen, phosphorus, silicon, germanium, tin or boron atoms, wherein E has a skeleton, and wherein the skeleton has at least one silicon, germanium or tin atom, and wherein Y is united with the silicon, germanium, or tin atom of E;
- n is a number of value 0 or 1;
- l is a number of value 0 or 1;
- each A is equal to or different from each other, wherein each A is a bridge group between unities L and C, wherein each A is a divalent atom of group 16, a trivalent monosubstituted element of group 15, a tetravalent disubstituted element of group 14, or a chain of 2 or more atoms that are substituted or not; and
- C is a carbon atom.

5. A catalyst system as claimed in claim 1, wherein the metallocene compound is supported on an inorganic solid containing hydroxyl groups.

6. A catalyst system as claimed in claim 5, wherein the inorganic solid has been previously modified through reaction with a compound having a formula V:

$$\text{V}$$

$$(X)_v-\underset{\underset{(R)_w}{|}}{\overset{\overset{(R)_z}{|}}{Si}}-(O-\underset{\underset{R}{|}}{\overset{\overset{R}{|}}{Si}})_t-(R)_u-P$$

wherein:
- each R is hydrogen, halogen, halocarbon, substituted halocarbon, $C_{1-20}$ alkyl, $C_{2-20}$ alkenyl, $C_{6-20}$ aryl, $C_{7-40}$ alkylaryl, $C_{7-40}$ arylalkyl, $C_{8-20}$ arylalkenyl, alkoxy, siloxy, or a combination thereof;
- X is halogen or group OR:
- P is $NH_2$, NHR, SH, OH or PHR;
- v+z+w=3, v being different from 0;
- t is 0 to 10:
- and u is 0 to 10.

7. A catalyst system as claimed in claim 5, wherein the inorganic solid is selected from the group consisting of silica, silicates, carbonates, phosphates, clays, metal oxides, and mixtures thereof.

8. A catalyst system as claimed in claim 1, wherein the cocatalyst is selected from the group consisting of non-coordinating compounds of alumoxane-type, modified alumoxane-type, boron compounds, and combinations thereof.

9. A catalyst system as claimed in claim 8, wherein the cocatalyst is methylalumoxane, dimethylaniline tetrakis boron, or trispentafluorophenylborane.

10. A catalyst system as claimed in claim 2, wherein the metallocene compound is supported on an inorganic solid containing hydroxyl groups.

11. A catalyst system as claimed in claim 3, wherein the metallocene compound is supported on an inorganic solid containing hydroxyl groups.

12. A catalyst system as claimed in claim 4, wherein the metallocene compound is supported on an inorganic solid containing hydroxyl groups.

13. A catalyst system as claimed in claim 1, wherein the cyclopentadienyl-type unity is cyclopentadienyl, indenyl, or fluorenyl.

14. A catalyst system as claimed in claim 2, wherein the cyclopentadienyl-type unity is cyclopentadienyl, indenyl, or fluorenyl.

15. A catalyst system as claimed in claim 3, wherein the cyclopentadienyl-type unity is cyclopentadienyl, indenyl, or fluorenyl.

16. A catalyst system as claimed in claim 2, wherein, in the definition of A, the divalent atom of group 16 is —O—: the trivalent monosubstituted element of group 15 is >NR; the tetravelent disubstituted element of group 14 is >C(R)$_2$ or >Si(R)$_w$; or the chain of 2 or more atoms that are substituted or not is —C—C—, —C—Si—, —Si—Si—, —Si—O—, —C—O, —C—N—, —C—C—C—, —C—Si—C—, or —Si—O—Si—.

17. A process for preparing a catalyst system as claimed in claim 5, wherein the metallocene compound and the inorganic solid are put in contact by using tetrahydrofurane as a solvent.

18. A process for polymerization of alpha-olefins, optionally in combination with a cyclic olefin and/or a diene, wherein the polymerization is catalyzed by the catalyst system claimed in claim 1.

19. A process as claimed in claim 18, wherein the process polymerizes monomers selected from the group consisting of ethylene, propene, 1-butene, 1-hexene, 4-methyl-1-pentene, 1-octene, and mixtures thereof.

20. A process as claimed in claim 18, wherein the process copolymerizes ethylene in combination with a comonomer selected from the group consisting of propene, 1-butene, 1-hexene, 4-methyl-1-pentene, 1-octene, cyclic olefins, and mixtures thereof.

21. A catalyst system comprising a metallocene compound in combination with a cocatalyst, wherein the metallocene compound is selected from the group consisting of ((chloromethylsilanediyl)bis(cyclopentadienyl))zirconium (IV) dichloride{,}and ((chloromethylsilanediyl)bis (cyclopentadienyl))-hatnium (IV) dichloride.

22. A catalyst system comprising a metallocene compound in combination with a cocatalyst, wherein the metallocene compound is selected from the group consisting of -continued

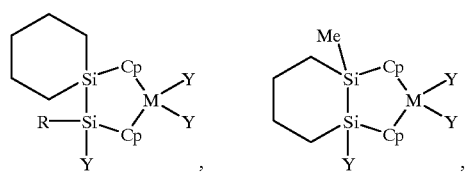
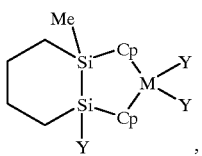
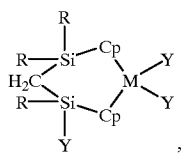
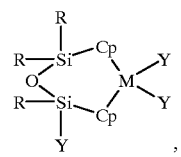
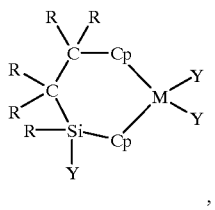
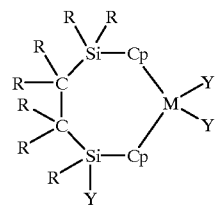
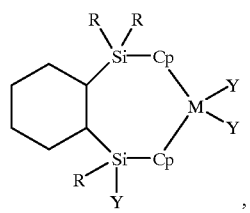
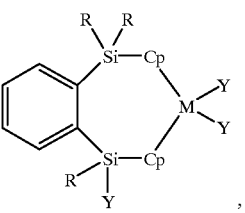
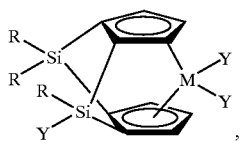
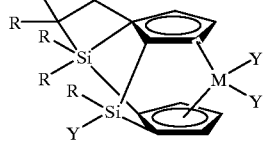
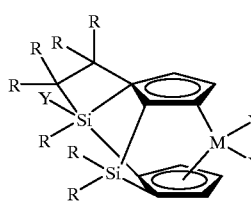
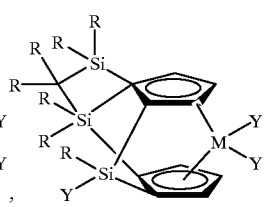
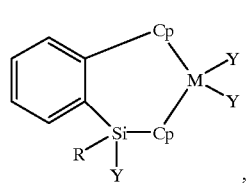
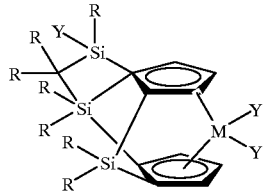
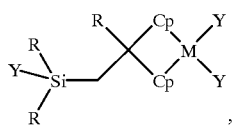
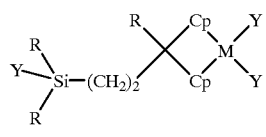

-continued

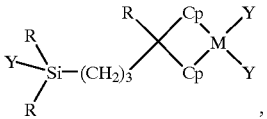
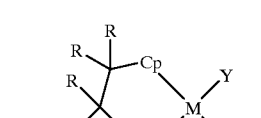
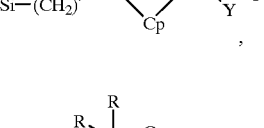
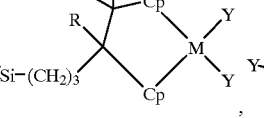
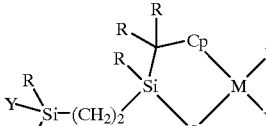
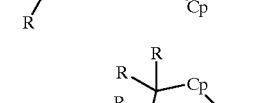, and
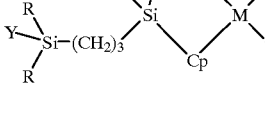;

wherein:

M is a transition metal of group 3, 4, 5, or 6 of the periodic table;

R is hydrogen, halogen, halocarbon, substituted halocarbon, $C_1$–$C_{20}$ alkyl, $C_2$–$C_{20}$ alkenyl, $C_6$–$C_{20}$ aryl, $C_7$–$C_{40}$ alkylaryl, $C_7$–$C_{40}$ arylalkyl, $C_8$–$C_{20}$ arylalkenyl, alkoxy, siloxy, or a combination thereof;

each $C_p$ is independently selected from the group consisting of a cyclopentadienyl ring, a substituted cyclopentadienyl ring, a substituted indenyl ring, a nonsubstituted indenyl ring, a substituted fluorenyl ring, and a nonsubstituted fluorenyl ring;

Y is halogen; and

C is a carbon atom.

* * * * *